US006000277A

United States Patent [19]

Smith et al.

[11] Patent Number: 6,000,277

[45] Date of Patent: Dec. 14, 1999

[54] METHOD FOR THE PREDICTION OF RUPTURE IN CORRODED TRANSMISSION PIPES SUBJECTED TO COMBINED LOADS

[75] Inventors: Marina Quiocho Smith, San Antonio, Tex.; Wei Wang, Columbia, Md.; Carl Harry Popelar, San Antonio; James Alan Maple, Baytown, both of Tex.

[73] Assignee: Southwest Research Institute, San Antonio, Tex.

[21] Appl. No.: 09/092,530

[22] Filed: Jun. 5, 1998

[51] Int. Cl.$^{6}$ ............................... G01M 3/02; G01B 5/30

[52] U.S. Cl. ............................ 73/37; 73/49.1; 73/40.5 R; 73/49.5; 73/760; 73/783; 73/789

[58] Field of Search ......................... 73/37, 49.1, 40.5 R, 73/49.5, 826, 86, 760, 783, 787, 788, 789, 804; 285/114; 138/172; 702/34; 395/500

*Primary Examiner*—Hezron Williams
*Assistant Examiner*—Jay L. Politzer
*Attorney, Agent, or Firm*—Madan, Mossman & Sriram, P.C.

[57] ABSTRACT

A method of predicting rupture failure for corroded transmission pipelines uses a model that accounts for the effects of residual and thermal stresses, and settlement of the pipe following installation. The pressure required for failure under a fixed bending moment is different from the pressure required wherein the same bending moment is produced by the settlement of the pipe because the bending compliance increases with plastic straining. The failure criterion depends upon whether or not the hoop strain exceeds the difference between the ultimate hoop strain limit of the material and the remaining hoop strain capacity needed for the material to shed the axial stresses due to bending.

9 Claims, 2 Drawing Sheets

METHOD FOR THE PREDICTION OF RUPTURE IN CORRODED TRANSMISSION PIPES SUBJECTED TO COMBINED LOADS

FIELD OF THE INVENTION

The invention provides a means of predicting rupture failure for corroded transmission pipelines within the oil and gas transmission industry. Specifically, this invention is intended to assist operators charged with the maintenance and operation of transmission pipe with the decision to repair or replace a section of corroded pipe which is subjected to internal pressure, axial compression or tension, and longitudinal bending.

BACKGROUND OF THE INVENTION

Extensive metal loss due to corrosion of pipelines can significantly increase the risk of rupture. It is vitally important to estimate the residual strength of corroded pipelines so that proper remedial actions may be taken to avoid catastrophic events. Some prior art methods rely on invasive techniques for measuring the residual strength of corroded structures.

Lacey (U.S. Pat. No. 4,389,877) discloses a system to monitor the amount of erosion taking place within a pipe. A point of reduced strength of the pipe is made by drilling a hole or a notch to a preselected depth in the pipe wall. A hollow casing is provided around the point of reduced strength to provide a sealed zone. A conduit in the hollow casing is connected to a sensing device to monitor pressure changes when pipe failure occurs at the hole or notch.

Others have relied on field simulation. Jones (U.S. Pat. No. 3,846,795) discloses a device in which a housing containing a corrodible member is coupled to the structure so as to expose the corrodible member to the same corrosive environment as the structure itself. The corrodible member is constructed and stressed so as to fail before the structural element. Failure of the corrodible member gives an indication that the failure of the structural element is approaching, allowing shut-down of the system and repair or replacement of failing structural elements.

Currently, the noninvasive assessment of corroded pipelines in the United States is based upon ASME B31G (1991) and modified guidelines RSTRENG (Kiefner and Vieth, 1993). These guidelines are empirically based and are limited in the range of pipe grade and operating conditions for which they yield conservative results. Because they only consider pressure loading, their application precludes failure predictions under combined loadings. Therefore, a reliable analysis model is required to assess the residual strength of a corroded pipe under combined loadings.

Models that apply to pipes subjected to combined pressure, bending and axial loading are rare. Under combined pressure and bending, the existing models usually employ a failure locus in the pressure and moment space. Rupture is presumed to occur if the combination of pressure and moment plots outside of the locus (Smith and Grigory, 1996; Stephens, 1996). This approach implies that under dead loading, bending will reduce the pressure at rupture. However, this need not be the case in the field where displacement controlled bending and axial loading are induced by differential settlement and axial constraint. Recent studies (Grigory and Smith, 1996; Smith et al., 1998; Wang et al., 1998), have demonstrated that the axial stresses within the corroded region due to bending and thermal expansion decrease to nearly zero at rupture provided sufficient strain capacity in the material exists. The implication is that the rupture pressure of a corroded pipe under combined pressure and fixed displacement secondary loading is the same as that for a pipe under internal pressure only, if sufficient strain capacity exists.

SUMMARY OF THE INVENTION

The present invention includes the use of a new strain-based model designed to predict rupture conditions for modern ductile pipes which are buried, corroded, and subjected to internal pressure and displacement controlled bending and axial constraints. For a pipe under combined internal pressure P and axial bending moment M, failure in an extensive corroded region of a pipe due to excessive ductile straining may be expressed by the von Mises yield criterion $$\frac{3}{4}\sigma_\theta^2 + \sigma_b^2 = \sigma_0^2 \tag{1}$$

where $\sigma_\theta$ is the hoop stress due to pressure, $\sigma_b$ is the axial bending stress in the corroded region, and $_o$ is the flow stress. In writing Eq. (1), the axial stress due to the internal pressure is taken to be one-half the hoop stress. When $\sigma_\theta$ and $\theta_b$ are expressed in terms of P and M, Eq. (1) above assumes the form of the failure envelope depicted in FIG. 1.

Two different types of failure modes can occur depending upon how the bending moment is transmitted to the corroded pipe. For example, if a fixed (dead load) bending moment $M_o$ is first applied to the section containing the corroded region, the path AB in FIG. 1*a* is followed during subsequent pressurization, with ductile rupture occurring at B with failure pressure $P_f$. Clearly, in this case the failure pressure depends on the applied moment $M_o$.

However, if the moment $M_o$ is produced by settlement of the pipe such that its curvature remains fixed during pressurization, the path to failure is that shown in FIG. 1*b*. The first part of AB of the path to failure remains unchanged from that for a fixed moment. The corroded area can withstand further pressure beyond point B for a fixed curvature because the bending compliance increases with further plastic straining. Consequently, the bending stress will decrease to accommodate the greater hoop stress necessary to balance the increased pressure and satisfy the criterion of Equation (1). While there will be no further increase in the axial strain, the hoop strain will increase at the expense of wall thickness. For a material with unlimited strain capacity, failure will occur at point C where the bending stress vanishes.

The present invention accurately predicts the onset of failure for a buried pipe (FIG. 1*b*), by calculating the strain in the pipe for each increment of loading applied. A load path that simulates actual field conditions; i.e., residual stresses from construction, thermal stress, internal pressurization, displacement controlled bending, and final pressurization (to rupture), is applied and the stress and strain at the end of each load increment are determined and evaluated against the stress-strain capacity of the material. Essential to the analysis is the determination of the hoop strain present at the end of the bending load application. If the hoop strain remains below some critical value following application of the bending moment, a failure such as that in FIG. 1*b* is produced. Consequently, if the hoop strain is below this critical value following application of the residual, thermal, and bending loads, and sufficient strain capacity exists to allow for elimination of the secondary stresses, rupture failure will occur at the failure pressure defined by Eq. (2); totally unaffected by the axial and bending loads.

If the hoop strain exceeds some critical value during application of the residual stress/strain, thermal loading, or bending moment, rupture failure will be predicted by the new procedure.

DETAILED DESCRIPTION OF THE INVENTION

The present invention includes the use of a new strain-based model designed to predict rupture conditions for modern ductile pipes which are buried, corroded, and subjected to internal pressure and displacement controlled bending and axial constraints. For a pipe under combined internal pressure P and axial bending moment M, failure in an extensive corroded region of a pipe due to excessive ductile straining may be expressed by the von Mises yield criterion given by Eq. (1) above.

Figure 1A:
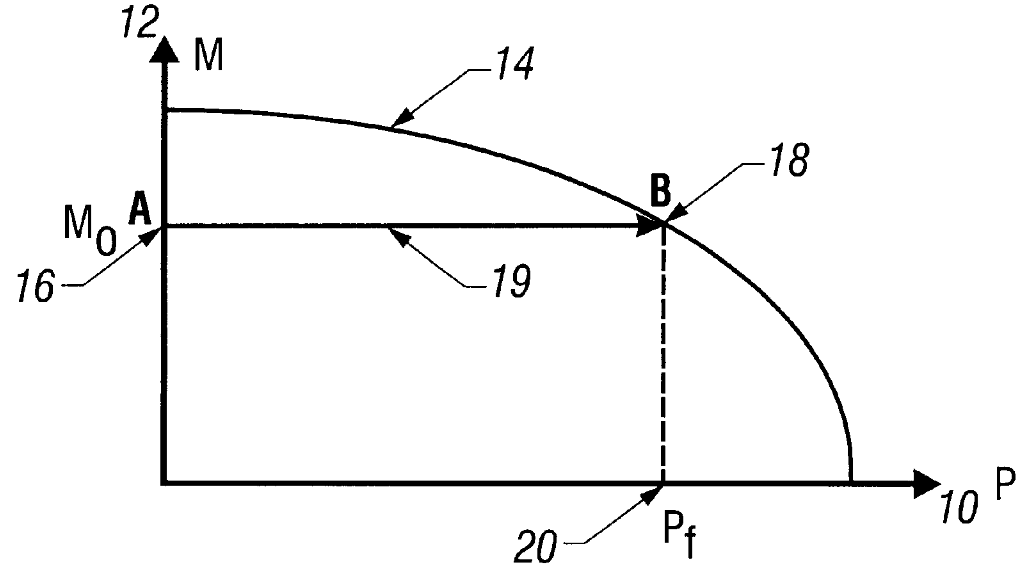
FIGS. 1A and 1B show the conditions for failure of a pipe in terms of the bending moment and the internal pressure.

As noted above, two different types of failure modes can occur depending upon how the bending moment is transmitted to the corroded pipe. FIG. 1A illustrates how failure occurs when a fixed (dead load) bending moment is first applied to the section containing the corroded region. The axis 10 corresponds to the internal pressure P of the pipe while the axis 12 denotes the axial bending moment. The curve 14 denotes the failure envelope given by equation (1). A "safe" condition corresponds to values of P and M that lie between 14 and the coordinate axes while a failure occurs when the values of P and M do not lie within this region. Application of a fixed bending moment $M_0$, denoted by the point 16 results in the path 19 being followed during subsequent pressurization, with ductile rupture occurring at 18 with failure pressure $P_f$ denoted by the point 20° Clearly, in this case the failure pressure depends on the applied moment $M_o$.

Figure 1B:
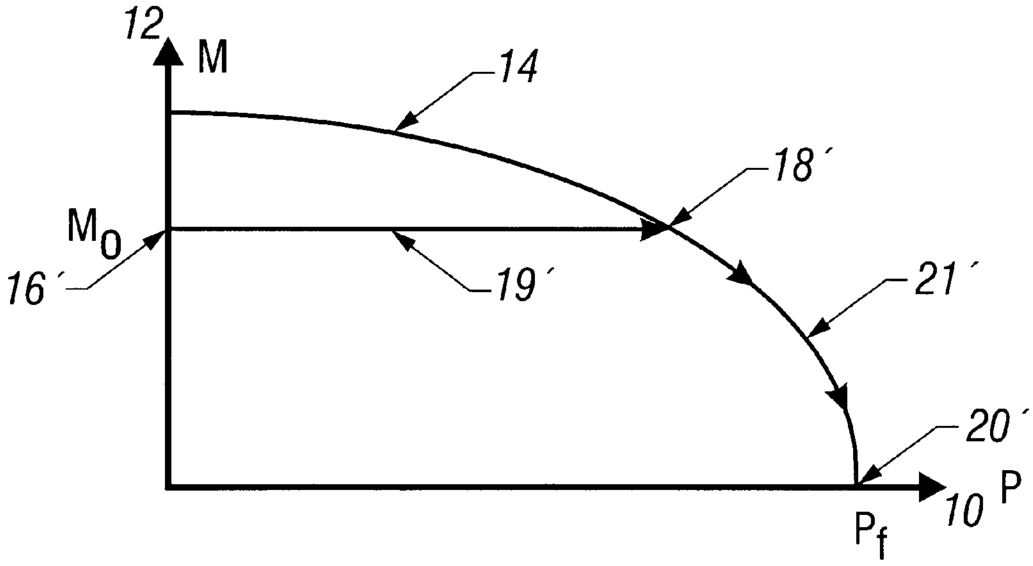

However, if the moment $M_o$ is produced by settlement of the pipe such that its curvature remains fixed during pressurization, the path to failure is that shown in FIG. 1*b*. The first part of 19' of the path to failure remains unchanged from that for a fixed moment. The corroded area can withstand further pressure beyond point 18' for a fixed curvature because the bending compliance increases with further plastic straining. Consequently, the bending stress will decrease to accommodate the greater hoop stress necessary to balance the increased pressure and satisfy the criterion of Equation (1), denoted by the path 21'. While there will be no further increase in the axial strain, the hoop strain will increase at the expense of wall thickness. For a material with unlimited strain capacity, failure will occur at point 20' where the bending stress vanishes.

The failure mechanism in FIG. 1*b* has been verified by full-scale tests and finite element analyses. Work by Gresnigt (1986) also successfully demonstrated this behavior for uncorroded pipe. The same phenomenon will occur for other fixed-displacement loadings (e.g.; residual stresses) that are generally characterized as self-equilibrated stress fields. While these stress fields will influence yielding, they do not impact the ductile failure because the compliance of the structure becomes unbounded and these self-equilibrated stresses vanish as the ductile failure point is approached.

The ductile rupture pressure for extensive corrosion reduces to $$p_f = \frac{2\sigma^{ult} t^*}{\sqrt{3}\, RB} \qquad (2)$$

where t * is the new thickness of the corroded region, R is the mean radius of the pipe, $\sigma^{ult}$ is the material's ultimate strength, and B is the so called "bulging factor" designed to reflect the bridging effect of surrounding uncorroded material and the influence of geometric changes.

To accurately predict the onset of failure for a buried pipe (FIG. 1*b*), strain in the pipe must be calculated for each increment of loading applied. For a load path that simulates actual field conditions; i.e., residual stresses from construction, thermal stress, internal pressurization, displacement controlled bending, and final pressurization (to rupture), the stress and strain at the end of each load increment must be determined and evaluated against the stress-strain capacity of the material. Essential to the analysis is the determination of the hoop strain present at the end of the bending load application. If the hoop strain remains below some critical value following application of the bending moment, a failure such as that in FIG. 1*b* is produced. Consequently, if the hoop strain is below this critical value following application of the residual, thermal, and bending loads, and sufficient strain capacity exists to allow for elimination of the secondary stresses, rupture failure will occur at the failure pressure defined by Eq. (2); totally unaffected by the axial and bending loads.

The new strain-based model includes rupture prediction for the failure mechanism shown in FIG. 1*b,* and has been embodied in a computer program to provide operators with a reliable and readily applicable analysis procedure for the evaluation of corroded pipes in-situ. Using field measured corrosion and curvature data, strains developed in the pipe are computed based on a realistic representation of the actual load path in the field.

Figure 2:
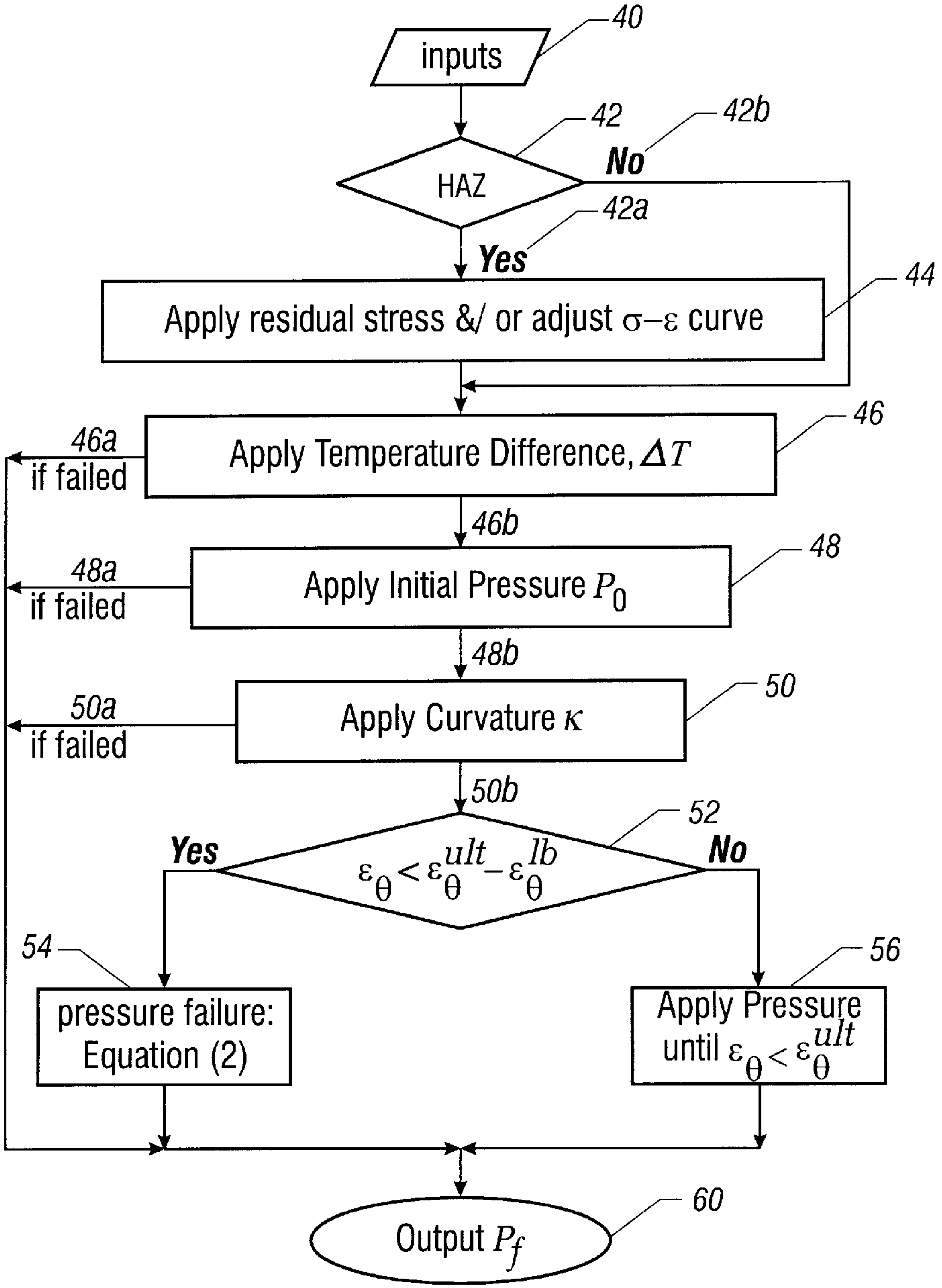
FIG. 2 illustrates the steps involved in the present invention for determination of failure conditions of a buried pipe.

The strain-based rupture prediction model for this load path is outlined in FIG. 2. At step 40, the various initial parameters are defined. These include data on pipe geometry, residual stress and strain from construction and installation of the pipeline, information about temperature at the time of installation of the pipeline and the present temperature, and data about the curvature (bending) and remaining wall thickness of the pipeline. The data on the curvature (bending) of the pipeline are obtained by known methods, such as surveying using ultrasonic methods. Also included are the characteristics of the material used in the pipeline such as the maximum allowable hoop strain in the material, and yield and ultimate stresses and strains.

A check is made at 42 to see if the location of interests is a special zone, e.g., a welded or heat affected zone where there may be alterations in the local stress pattern from welding resulting in residual stress; or a field bend where residual stresses and strains from manufacture are present. If so 42*a,* the residual stress is applied and the stress-strain curve is adjusted for the residual stress using methods known in the art. If not 42*b,* this step is bypassed and the process proceeds to apply the effect of thermal loading caused by a difference between the temperature at the time of pipeline installation and present temperature. This effect would be familiar to those versed in the art. A check is made to see if the strain exceeds the maximum allowable hoop strain specified in the input parameters. If yes 46*a* failure will occur with no pressurization of the pipeline and the failure pressure $P_f$ at 60 is zero. If no 46*b* the additional stress related to initial pressurization $P_0$ of the pipeline is determined 48 and again a check is made to see if the strain exceeds the maximum allowable hoop strain specified in the input parameters. If yes 48*a* failure will occur at the initial pressure $P_0$ of the pipeline and the failure pressure $P_f$ at 60 is $P_0$.

If the test at 48 has a negative result 48*b* the next step of loading due to the bending of the pipeline is applied 50. If the combination of the curvature loading and the initial pressure $P_0$ lies above the curve 14 in FIG. 1 above, failure will occur 50*a*. If not, then the method of the invention proceeds to the next step 52 that is related to the failure due to pressurization. Steps 44, 46, 48 and 50 are, for the purposes of the present invention, deemed to apply the effects of "preloading".

The test applied at 52 is to check whether $\epsilon_\theta$, the hoop strain, is less than the difference between $\epsilon_\theta^{ult}$, the ultimate hoop strain limit of the material, and $\epsilon_\theta^{lb}$, the remaining hoop strain capacity needed for the material to "shed" the axial stresses due to bending, thermal, or residual effects, i.e., for the pipeline to reach the point denoted by 20' in FIG. 1B. The method of calculating $\epsilon_\theta$ and $\epsilon_\theta^{lb}$ is discussed below. If the answer to the test at 52 is affirmative, the method proceeds to step 54 where Eq. (2) is employed to compute the rupture pressure. If the hoop strain can be estimated accurately, the rupture pressure can be obtained by applying the pressure until the hoop strain exceeds the limit strain value. That is, the detailed strain capacity calculations and comparisons of the right route are not necessary. However, the computed hoop strain is only an upper bound to the actual hoop strain. Therefore, as long as sufficient strain capacity remains to shed the influence of bending and other secondary stresses, Eq. (2) will yield a less conservative prediction of the rupture pressure.

If the answer to the test at 52 is negative, the method proceeds to step 56 where the pressure is increased until $\epsilon_\theta$ exceeds $\epsilon_\theta^{ult}$.

The actual hoop strain $\epsilon_\theta$ is very difficult to compute due to the occurrence of plasticity near rupture and the complex corrosion geometry. Therefore, an upper bound solution is used to calculate strains. In general, a pipe with a uniformly thinned corrosion patch of thickness t* has a lower ductile rupture pressure than the pipe with a nonuniform corroded patch having a minimum thickness of t*. Therefore, to obtain an upper bound on the hoop strain of a nonuniform corroded area, the hoop strain in a uniformly thinned patch of thickness t* can be used.

The membrane strain and stress at the top or bottom (maximum compression or tension regions) fiber of an uncorroded pipe with thickness equal to that of the thinned area on a corroded pipe (t*) are greater than the actual membrane strain and stress in the thinned area, except in the thickness transition zone where stress concentrations may occur. However, after the material has yielded, the stress concentration effect will vanish. Therefore, the hoop strain at the top or bottom fiber of an uncorroded thin pipe of wall thickness t* can be used to bound the hoop strains in a corroded pipe with minimum thickness equal to t*.

To compute the hoop strain at the top and bottom of an uncorroded pipe under the given load path, plastic flow theory with isotropic hardening [Chen and Han, 1988] is used. Plane strain is assumed during thermal loading and pressurization, since it closely simulates the condition for a long buried pipe. No buckling and ovalization is considered.

The strain capacity needed for the secondary axial stresses to vanish while internal pressure increases, $\epsilon_\theta^{lb}$, is determined with the assistance of the new strain-based rupture model outline in FIG. 2. For several combinations of initial secondary axial stresses, the model is executed and the total secondary axial stress and hoop strain is monitored while the internal pressure is increased. The total secondary axial stress includes contributions from bending, thermal loading and residual stresses. The hoop strain value at which the total secondary axial stress vanishes is recorded. For a typical X65 steel, a maximum of 2% strain is required for the total secondary axial stress to drop to zero while internal pressure increases. That is, $e_\theta^{lb}=0.02$. For other materials, this limit can be easily determined using the model.

The size of the corrosion patch and the deformation of the patch both affect the stress state in the patch, and thus, the rupture pressure. When the axial length of the patch is small, the "bridging effect" tends to reduce the hoop stress. Internal pressure causes a ballooning effect at the thinned region, which affects the hoop stress as well. These effects are usually consolidated into a so called "bulging factor." In the current strain-based model, the bulging factor is applied to the hoop stress which is used to compute the hoop strain. The most convenient form for the bulging factor, B, to be used in the new model is $$\sigma_\theta = \frac{PRB}{t^*} \tag{3}$$

Eq. (2) is obtained when Eq. (3) is substituted into Eq. (1) with $\sigma_b=0$. The bulging factor B is expressed as $$B = \frac{1.155t^*}{1 - d/t\left[1 - \exp\left(-0.173\frac{L}{\sqrt{Rt^*}}\right)\right]} \tag{4}$$

and is applied only after yielding since that is when large deformations in the patch have significant effect on the stresses and strains. In equation (4), t is the thickness of the uncorroded portion of the pipeline.

Extensive work was carried out by Hohl and Vogt (1992) to determine the allowable strain limit that a pipe can withstand without rupturing. They concluded that such a limit depends on the yield to tensile strength ratio (Y/S) and uniform elongation strain limit of the material. For example, for a material with Y/S<0.9, the minimum allowable hoop strain is greater than 69% of the allowable uniform elongation strain. For a typical X65 steel, the yield to tensile strength ratio is usually less than 0.9, and the uniform elongation strain limit is generally greater than 12%. Therefore, the hoop strain should be able to reach 8% before rupture takes place. Accordingly, a lower bound value of the critical strain equal to 8% has been applied in the current rupture model, which was verified by full-scale tests (Grigory and Smith, 1996; Smith et al., 1998). However, the model is general, and appropriate hoop strain limits should be used for other materials.

The foregoing description has been limited to specific embodiments of this invention. It will be apparent, however, that variations and modifications may be made to the disclosed embodiments, with the attainment of some or all of the advantages of the invention. In particular, the invention may be modified to make density and acoustic measurements. Therefore, it is the object of the appended claims to cover all such variations and modifications as come within the true spirit and scope of the invention.

What is claimed is:

1. A method of determining an internal pressure required for rupturing a selected portion of a pipeline, said pipeline being made of a material having a limit strain value, said method comprising:

(a) obtaining a radius of curvature of the selected portion of the pipeline;

(b) obtaining a thickness of the selected portion of the pipeline;

(c) defining a failure criterion for the material in terms of a hoop stress and an axial bending stress;

(d) determining the effect on a stress-strain relation of the selected portion of the pipeline from a preloading; and (e) determining a remaining hoop strain capacity from steps (a)–(d) needed for the material to shed an axial stress, said remaining hoop strain capacity being used in determining the internal pressure needed for rupturing.

2. The method of claim 1 wherein the preloading comprises at least one of:

(a) a residual stress and strain from manufacturing, construction and installation of the pipeline, (b) a thermal loading of the pipeline, (c) an initial pressurization of the pipeline, and (d) a bending related to the radius of curvature determined in step (a) of claim 1.

3. The method of claim 1 further comprising using a failure criterion for the pipeline dependent upon the limit strain value and the remaining hoop strain capacity for determining the internal pressure needed for rupturing.

4. The method of claim 3 wherein the failure criterion for the pipeline is an internal pressure required to cause a hoop strain in excess of the limit strain value when the state of strain of the pipeline is less than the difference between the limit strain value and the remaining hoop strain capacity.

5. The method of claim 4 wherein the selected failure criterion is related to the thickness of the selected portion of the pipeline, the ultimate strength of the material, the radius of curvature of the pipeline and a bulging factor.

6. The method of claim 4 wherein the determination of the hoop strain further comprises determination of an upper bound on the hoop strain based upon the thickness of the selected portion of the pipe.

7. The method of claim 3 wherein the failure criterion for the pipeline is a hoop strain in excess of the limit strain value when the state of strain of the pipeline is greater than the difference between the limit strain value and the remaining hoop strain capacity.

8. The method of claim 7 wherein the determination of the hoop strain further comprises determination of an upper bound on the hoop strain based upon the thickness of the selected portion of the pipe.

9. The method of claim 1 wherein the selected portion of the pipeline is a portion of the pipeline that has undergone corrosion.

* * * * *